Nov. 22, 1960 W. T. DAROU, JR., ET AL 2,961,494

MAGNETIC HEAD ASSEMBLIES

Filed May 25, 1956 3 Sheets-Sheet 1

INVENTORS

WILLIAM T. DAROU, JR
WILLIAM J. GORMAN
JAMES F. METCALF

BY Joseph Weingarten

ATTORNEY

INVENTORS
WILLIAM T. DAROU, JR
WILLIAM J. GORMAN
JAMES F. METCALF
BY Joseph Weingarten
ATTORNEY

*INVENTORS*
WILLIAM T. DAROU, JR.
WILLIAM J. GORMAN
JAMES F. METCALF

BY Joseph Weingarten
*ATTORNEY*

United States Patent Office 2,961,494
Patented Nov. 22, 1960

2,961,494

MAGNETIC HEAD ASSEMBLIES

William T. Darou, Jr., Boston, William J. Gorman, Groton, and James F. Metcalf, Westwood, Mass., assignors to Laboratory for Electronics, Inc., Boston, Mass., a corporation of Delaware Filed May 25, 1956, Ser. No. 587,231

20 Claims. (Cl. 179—100.2)

The present invention relates in general to new and improved means for processing information in magnetic data storage systems and represents an extension of the principles set forth in a co-pending application by Harrison W. Fuller, Sidney P. Woodsum and William T. Darou, Jr., entitled Magnetic Head Assemblies, Serial No. 566,261, filed February 17, 1956, and now Patent No. 2,913,536, issued November 17, 1959.

The term processing information is taken as descriptive of the process of recording of data, i.e., the transfer of information into the storage system, as well as the reading of data out of the system. In the following discussion, for the sake of clarity, reference will be made to the recording of data, it being understood that the improvements discussed herein are equally applicable when data is read out.

In general, the term magnetic recording relates to a process whereby data is stored in a magnetic medium, the data to be stored being transferred to the recording surface of the magnetic medium by means of a magnetic head. The data signals may be in analog or digital form having spectral components at audio frequencies or higher. Magnetic storage systems are peculiarly adapted to the processing of data reduced to binary code notation. In such notation the data is reduced to binary digits or bits, one bit of data being represented by either a Zero or a One pulse.

The number of bits of data which may be stored per linear inch of recording surface is limited, among other factors, by the spacing of the pole pieces of the magnetic head from the recording surface of the magnetic medium. The pole pieces are separated from each other by a short gap and terminate in a common pole face surface with the gap traversing the width thereof. Magnetic flux lines are set up between the pole pieces across the gap, the fringing flux lines encountering the recording surface and magnetizing a predetermined portion thereof. A short gap is necessary to yield high resolution when recording as well as when reading out data. The ratio between gap length and the wavelength of stored data should not exceed 1:4. For example, in high density recording of the order of 1000 bits per inch, the gap length should not exceed ¼ mil. The spacing of the pole face surface from the recording surface, as measured at the gap, is in large part responsible for the spreading of magnetic flux between these surfaces. When flux spreading occurs, the lines of flux, which fringe between the two pole pieces, magnetize a greater than desired portion of the recording surface. In magnetic data storage systems where the wavelength of the recorded information measured along the recording medium is relatively short, for example, high density digital data storage systems where the number of bits to be stored per linear inch may exceed one thousand, minimum flux spreading is required to concentrate the magnetic field and bring about high resolution of data. Accordingly, minimum spacing between the surfaces, as measured at the gap, is necessary.

The physical separation between the pole face surface and the recording surface which will maintain tolerable flux spreading in high density magnetic recording of the order of 1000 bits per inch, is approximately 0.2 mil as measured at the gap of the pole face surface. To obtain constant separation of comparable magnitude between these surfaces during operation of the high density magnetic data storage system, the instant invention utilizes the principle of hydrodynamic lubrication which is more fully set forth in a co-pending application by Harrison W. Fuller and Carl W. Ledin, entitled Magnetic Data Storage Techniques, Serial No. 564,229, filed February 8, 1956, and a co-pending application of Carl W. Ledin, William J. Gorman and George E. Engman, entitled Magnetic Data Storage Apparatus, Serial No. 572,025, filed March 16, 1956.

In practice, the two surfaces are biased toward each other through the application of force. Thereafter, an exchange of data between the pole pieces and the recording surface may be effected. Relative lateral motion of the two surfaces is initiated to expose different portions of the recording surface to the action of the magnetic head. In one embodiment, one of the surfaces is pivotally arranged with respect to the other one to form the desired angle of inclination, or tilt angle, therewith. A lubricating fluid is applied and the relative lateral motion of the surfaces produces fluid flow. This in turn develops a hydrodynamic effect to cause the leading edge of the pivotally mounted surface to increase its spacing from the recording surface relative to the trailing edge. The hydrodynamic effect further exerts a lifting force, a component of which balances the biasing force at a predetermined spacing of the surfaces. It will be understood that the identical equilibrium condition may be achieved where no pivoting is used and the tilt angle between the surfaces is structurally fixed, all other parameters remaining the same.

Previous magnetic head assemblies have employed a dual leaf spring head mount. In such assemblies the dual spring provides the requisite biasing force which urges the pole face surfaces against the recording surface. This requires precision mounting of the leaf springs to make them absolutely parallel. Frequently, peening of the springs into the slots provided for them in the head mount assembly causes them to bow outwardly and become non-parallel. Similarly, the holes of the two leaf springs which receive the leaf spring mounting screws must be precisely aligned. It will be understood that misalignment or nonparallelism of the type mentioned above will cause a relative torsional deflection of the two head mount portions adjacent the springs and a consequent misalignment of the pole face surfaces relative to the recording surface. In a high density magnetic data recording sysem, where the spacing between magnetic tracks on the recording surface is of the order of 10 mils, the above said torsional deflection, added to the deflection due to the weight of the magnetic head and the collected oil thereon, will impose severe limitations on the dimensional tolerances of the apparatus. Such limitations will increase the cost of manufacturing the equipment, while diminishing the reliability due to the enhanced possibility of cross talk between adjacent tracks.

The magnetic head member employed in previous magnetic head assemblies of this nature, consists of an epoxy resin structure which is precision molded to support the various components of the head member. This type of construction is cumbersome and uneconomical, since it requires the use of a mold as well as requiring the precision alignment of the various components of the head member within the mold until the resin hardens by curing.

Accordingly, it is an object of this invention to provide new and improved magnetic head assemblies for processing information in short wavelength magnetic data storage systems which are not subject to the foregoing disadvantages.

It is another object of this invention to provide novel magnetic head members and single leaf spring head mounts therefor for use in high density magnetic data storage systems.

It is a further object of this invention to provide single leaf spring magnetic head assemblies in high density magnetic data storage systems capable of having their pole face surfaces readily aligned with respect to the recording surface.

It is an additional object of this invention to provide precision head members for magnetic head assemblies which do not require the use of a mold for their construction.

These and other novel features of the invention together with further objects and advantages thereof will become more apparent from the following detailed specification with reference to the accompanying drawings, in which:

Fig. 9 is a sectional view of the apparatus of Fig. 8 taken along line 9—9.

In accordance with the principles of this invention, a fixed bracket is provided having mounting units thereon which cooperate with separate clamping units to mount respective single leaf spring head mounts. One end of each leaf spring is adapted to link with a magnetic head and to flexibly resist pressure on said head in a direction normal to the recording surface. Each of the aforesaid mounting units and its associated clamping unit cooperate further to provide angular positioning of the leaf spring by the relative motion of said units.

Figure 1:
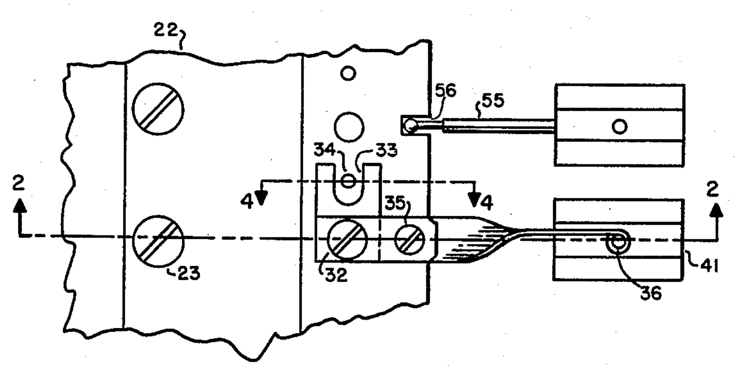
Fig. 1 illustrates one embodiment of the invention employing a twisted single leaf spring head mount.
Figure 2:
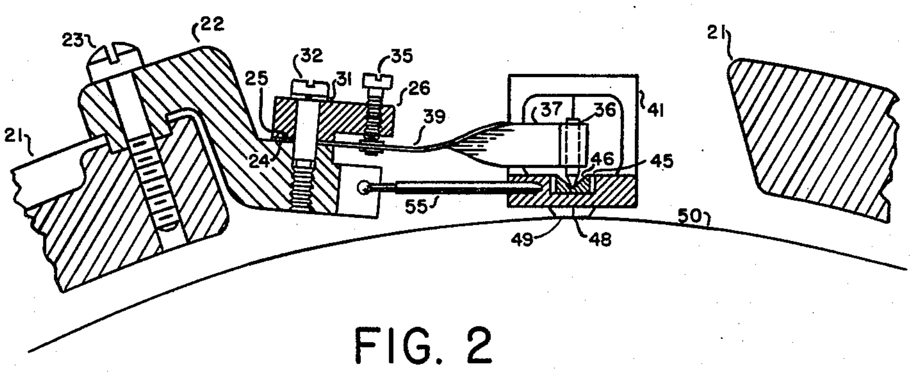
Fig. 2 is a sectional view of the apparatus of Fig. 1, taken along line 2—2.
Figure 3:
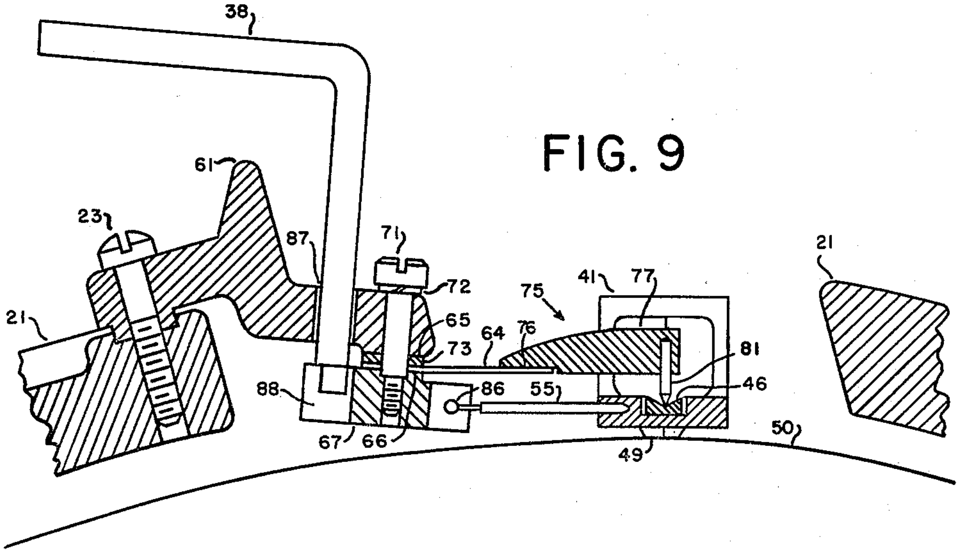
Fig. 3 illustrates the clamping unit of the apparatus of Figs. 1 and 2.
Figure 3:
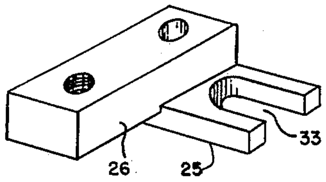

With reference now the drawings, Figs. 1, 2 and 3 illustrate a magnetic head assembly having a mounting unit 22 which runs the length of a bracket 21 disposed in fixed relationship to the drum or of the drum housing itself serving the same purpose, and is intermittently fastened thereto by means of mounting screws 23. The mounting unit further comprises a clamping surface 24 which cooperates with clamping surface 25 of clamping unit 26 to hold a single leaf spring 39 therebetween. Clamping unit 26 is fastened to the mounting unit by means of bolt 32 and cooperating spring washer 31. The threaded end of bolt 32 engages a mating thread in the mounting unit whereby the clamping surfaces maintain the desired clamping pressure on the leaf spring. The clamping unit further comprises an extension containing rounded slot 33 which cooperates with hole 34 in the mounting unit to provide angular positioning of the leaf spring about the axis of bolt 32, as hereinafter explained. Screw 35 engages both the clamping unit and the leaf spring, to fix the latter positionally relative to the clamping unit. The leaf spring is twisted so that its free end 37 lies in a plane orthogonal to the plane of the clamping surfaces. The free end of the leaf spring encircles a pivot pin 36 fastened thereto which is adapted to mate with conical jewel bearing 46 of dual magnetic head member 41. The head member comprises two pairs of pole pieces, each pair terminating in a common pole face surface 49. Single leaf spring 39 urges the pole face surfaces against recording surface 50 of the magnetic drum. Slot 56 which defines two limit stops in mounting unit 22, receives the end of stabilizing rod 55 of the head member, as hereinafter explained in greater detail.

Figure 4:
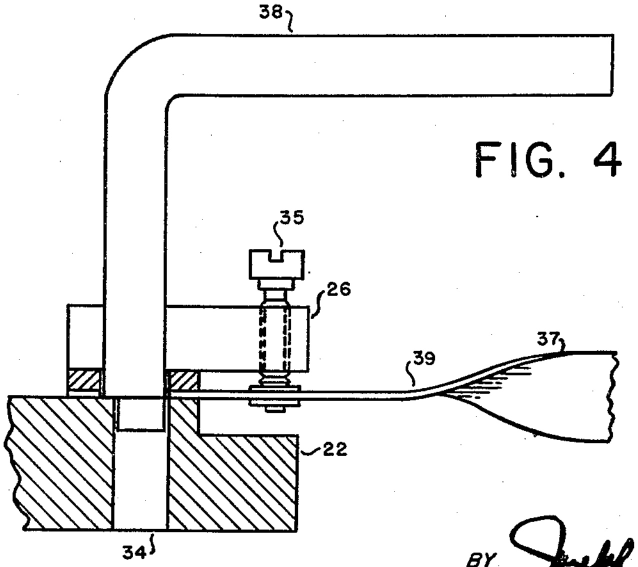
Fig. 4 is a sectional view of the apparatus of Fig. 1, taken along line 4—4 and illustrates the angular positioning of the leaf spring for the purpose of aligning the attached pivot pin.

Fig. 4 illustrates the procedure for aligning the pole face surfaces relative to the recording surface in the apparatus of Figs. 1 and 2. An eccentric offset wrench 38 is inserted into hole 34 through slot 33 immediately above. After the clamping bolt 32 (invisible in Fig. 4) is loosened, the angular motion of the wrench will alter the alignment of slot 33 relative to hole 34, due to the eccentric shape of the wrench. The resultant angular motion of clamping unit 26 about the axis of bolt 32 will bring about the angular positioning of leaf spring 39 which is rigidly attached to mounting unit 26 by means of screw 35 and hence, it will bring about the alignment of the pivot pin which is rigidly fastened to the spring. Since the jewel bearing of the head member mates with the pivot pin, the alignment of the latter will ultimately determine the alignment of the pole face surfaces relative to the recording surface. After the desired alignment has been obtained, bolt 32 is tightened to prevent any further motion of the leaf spring about the aforementioned axis and thereby fixing the position of the pivot pin.

Figure 5:
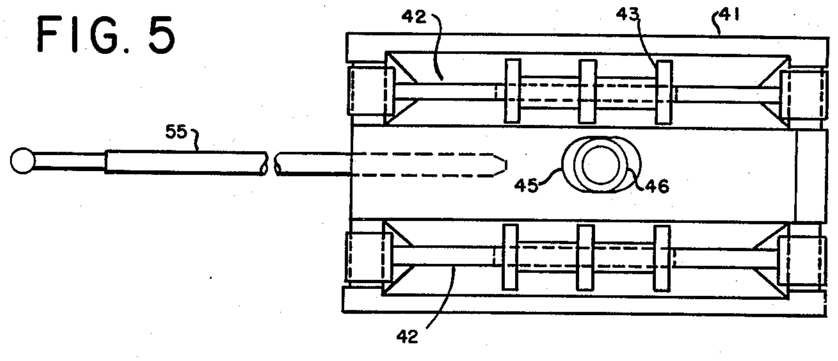
Fig. 5 illustrates a magnetic head member which is usable with the head mounts of the invention.
Figure 6:
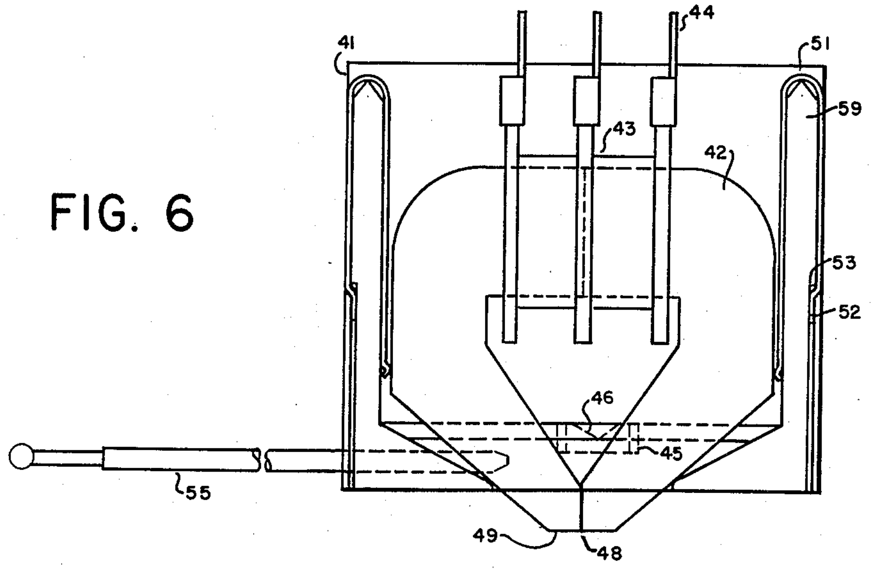
Fig. 6 is another view of the apparatus of Fig. 5.
Figure 7:
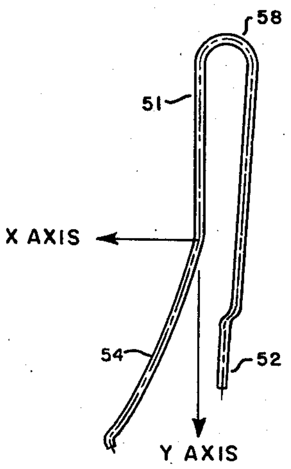
Fig. 7 illustrates the spring used in the apparatus of Figs. 5 and 6.

With reference now to Figs. 5, 6 and 7, a dual head member 41 and its components are illustrated capable of being used with the head mount discussed above. The head member comprises a pre-formed zinc die casting which supports two pairs of pole pieces 42 and an associated bobbin 43. Each bobbin is adapted to carry a coil of wire, the ends of which are connected to terminals 44 carried by the bobbin. The zinc die casting further comprises a rounded slot 45 adapted to have a conical jewel bearing 46 selectively positioned therein, said jewel bearing being adapted to mate with pivot pin 36 of the head mount. After the desired position of the jewel bearing has been selected, it is glued in place in the slot. Each pair of pole pieces is forced together in mirror image relationship and held in place within the die casting by a pair of hairpin springs 51. One hairpin spring is shown in relaxed position in Fig. 6. The hairpin curvature 58 divides the spring into two halves which have a tendency to draw together. One half of the spring terminates in an eccentric extension 52 parallel to the main portion. The other half comprises a cantilever portion running from the point of intersection of the $x$- and $y$-axes to the point of load application. The cantilever portion of the spring has a predetermined curvature 54 which is given by the equation:

$$x=\frac{-\frac{1}{2}PLy^2+\frac{Py^3}{6}}{3EI}$$

where:

$P$=force exerted on the spring at the point of load application, e.g. 5 lbs.;
$L$=length of the cantilever portion of the spring;
$E$=modulus of elasticity;
$I$=moment of inertia;

In the instant case, the curvature of the spring in its relaxed position is such that the cantilever portion will coincide with the $y$-axis when the spring is stressed, the maximum deflection, as measured at the point of load application, being of the order of ⅛ inch. When the springs are in place, the two halves of each spring grip a wall 59 of the zinc die casting between them. Eccentric spring extension 52 engages a step 53 on one side of said wall, thus barring any upward motion of the spring. The cantilever portion is flattened against the other side of said wall by the pole pieces. Thereafter, an epoxy resin filler is poured into the empty space between the components of the head member, to fix all the components in place upon curing. It will be noted, that it is unnecessary to mold the components of the magnetic head member in place in the instant embodiment and hence, the previously required precise positioning of said components during the molding process is obviated. Additionally, the need for special molds is eliminated. After it is cured, the epoxy resin firmly holds each pair of pole pieces and supplies the necessary structural support to the exclusion of the hairpin springs. The dual head member further carries a stabilizing rod 55 which terminates in a sphere. For the sake of clarity, the latter is shown with one magnetic head only, it being understood that head 41 carries an identical stabilizing rod. The free end of the stabilizing rod mates with slot 86 in mounting unit 22 to limit the angular motion of the head member about the axis of the pivot pin without restricting its motion in the plane of the free end 37 of the twisted leaf spring. A shim metal spacer is interposed between the tapered ends of pole pieces 42 which protrude from the zinc die casting in order to establish a magnetic gap 48 in the magnetic circuit constituted by said pole pieces. Each pair of pole pieces and the associated shim spacer terminate in a common pole face surface 49, the width of which is traversed by magnetic gap 48. As shown in Fig. 2, pole face surfaces 49 confront recording surface 50 of the magnetic drum and are urged against the recording surface by the action of the leaf spring.

Conical jewel bearing 46 which mates with pivot pin 36, as shown in Figs. 1 and 2, permits pivotal motion of the dual head member relative to the pin about the center of the bearing, while stabilizing rod 55 mates with slot 56 to limit the angular motion of the head member about the axis of the pivot pin. Accordingly, skewing of the pole face surfaces relative to the recording surface is prevented without restricting the other degrees of freedom of the head member.

In operation, single leaf spring 39 exerts pressure on the pivot pin to urge pole faces surfaces 49 of each head member against recording surface 50 of the magnetic drum. Motion of pivot pin 36 is restricted by the single leaf spring to the direction of pressure application. Rotation of the magnetic drum is initiated and oil is applied to the recording surface to form a film thereon. The lateral motion of the recording surface is imparted to the oil film to create oil flow relative to the pole face surfaces. A hydrodynamic effect develops which causes the pole face surfaces to tilt relative to the recording surface. Concurrently, a component of force of the hydrodynamic effect exerts a lifting force on the pole face surfaces, which force is flexibly resisted by the single leaf spring until equilibrium is reached at a predetermined mutual spacing of the recording surface and the pole face surfaces.

Figure 8:
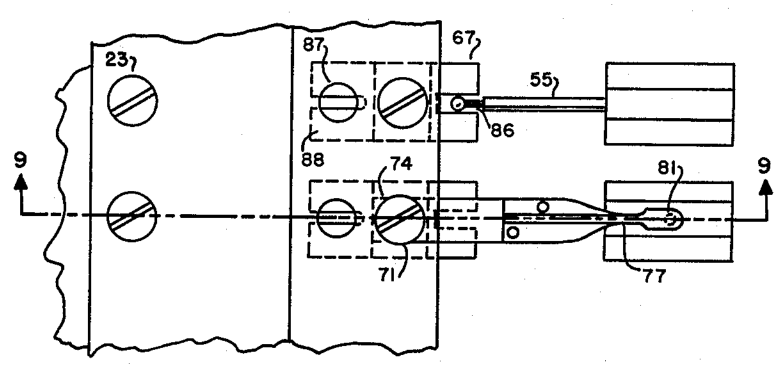
Fig. 8 illustrates another embodiment of the invention using a flat single leaf spring head mount.

Figs. 8 and 9 illustrate another embodiment of the invention using the magnetic head member of Figs. 5 and 6. Mounting unit 61, which extends the length of the drum, engages drum housing 21 by means of mounting screws 23 spaced along the housing in similar manner to the embodiment of Figs. 1 and 2. Each leaf spring 64 is held between clamping surface 65 of mounting unit 61 and surface 66 of clamping unit 67. Clamping bolt 71 engages a threaded bore in the clamping unit to provide the requisite clamping force in cooperation with spring washer 72. A spacer pad 73 is positioned intermediate the leaf spring and clamping surface 65. A flat rectangular slot 74 in the clamping unit defines clamping surface 66. The slot seats the clamped end of the leaf spring but is too shallow to accommodate the entire thickness of the spacer pad. The rest of the pad extends above the slot where it is engaged by clamping surface 65. The purpose of this arrangement is to achieve positive clamping of the leaf spring. As shown in Fig. 9, the bores of the two units are aligned with corresponding openings in the leaf spring and the spacer pad to receive the clamping bolt. A force arm unit 75 comprises a flat surface 76 which is bolted to the leaf spring. The central rib 77 of the force arm unit broadens out at its free end and contains pivot pin 81 fixed in a bore traversing said broadened end. The pivot pin mates with conical pivot bearing 46 of dual magnetic head member 41, which is identical in construction to the head member of Figs. 5 and 6. The end of stabilizing rod 55 mates with slot 86 of the clamping unit, said slot defining two limit stops which restrict the angular motion of the stabilizing rod about the axis of the pivot pin. A second bore 87 in the mounting unit is positioned above rounded slot 88 of the clamping unit. Similar to the embodiment of Fig. 4, the angular motion of an eccentric offset wrench 38, inserted into bore 87 and slot 88, will displace the clamping unit when the wrench is turned, provided the clamping bolt is loosened. The leaf spring, which is seated in shallow slot 74, is rotated together with the clamping unit about the axis of the clamping bolt. Pivot pin 81, which moves with the leaf spring by virtue of the connecting force arm unit, determines the position of head member 41. Accordingly, the pole face surfaces 49 of the head member may be readily aligned with respect to recording surface 50.

The operation of the instant embodiment follows that of Figs. 1 and 2. Any force on the pivot pin in a direction normal to the clamping surfaces is flexibly resisted by the leaf spring, while all other degrees of freedom of the pivot pin are substantially restricted. The pivot bearing leaves the head member free to pivot in any direction relative to the pivot pin, but angular motion about the axis of said pin is circumscribed by the interaction of the stabilizing rod and the limit stops, as described above.

It will be seen that accurate alignment of the pivot pin, and hence of the pole face surfaces, is readily available with the apparatus provided. The problems existing in the dual spring head mount, such as asymmetry of the leaf springs or in their mounting, are eliminated in the embodiments of the invention described. Accordingly, misalignment due to motion of the pivot pin in a plane which is not normal to the plane of the clamping surfaces, is eliminated.

The zinc die-cast magnetic head member of the invention is simple and economical to construct. The epoxy resin may be poured in after the member is fully assembled and the need for precision alignment of the divers components of the head member during the molding process is obviated. Additionally, the use of a mold is eliminated.

Having thus described the invention, it will be apparent that numerous modifications and departures may now be made by those skilled in the art. Consequently, the invention herein disclosed is to be construed as limited only by the spirit and scope of the appended claims.

What is claimed is:

1. In a head mount assembly for supporting at least one high density magnetic recording head, a mounting unit comprising a mounting surface and a first clamping surface, said mounting surface being adapted to engage a fixed bracket, a clamping unit comprising a second clamping surface, a first bore in each of said units piercing respective clamping surfaces, a clamping screw adapted to mate with both of said bores when said clamping surfaces are aligned, a single leaf spring positioned with one end intermediate said clamping surfaces, said spring having an opening to receive said clamping screw, pivotal linking means associated with the free end of said leaf spring, said leaf spring flexibly resisting pressure on said pivotal linking means in a direction normal to said clamping surfaces while substantially restraining all other degrees of freedom of said linking means.

2. The apparatus of claim 1 wherein said mounting unit contains a second bore, a slot in said clamping unit aligned with said second bore, said units capable of being rotated relative to each other about the axis of the clamping screw by the displacement of said slot relative to said second bore, and means fastening said leaf spring to said clamping unit whereby said spring may be angularly positioned relative to the mounting unit.

3. The apparatus of claim 2 wherein said pivotal linking means comprises a pivot pin adapted to mate with a conical pivot bearing.

4. The apparatus of claim 3 wherein one of said units includes a pair of limit stops adapted to mate with a stabilizing rod to restrict the angular motion of said rod about the axis of said pivot pin.

5. The apparatus of claim 4 wherein said leaf spring is flat, a force arm unit interposed between said leaf spring and said pivot pin, one end of said force arm unit adapted to engage the free end of said spring, the other end of said force arm unit containing an opening adapted to support said pivot pin at right angles to said clamping surfaces.

6. The apparatus of claim 5 wherein said means for fastening the leaf spring to the clamping unit comprises a shallow rectangular slot in the clamping surface of said clamping unit, a spacer pad adapted to be positioned intermediate said spring and the clamping surface of said mounting unit, said pad having an opening to receive said clamping screw, said rectangular slot accommodating said one end of the leaf spring and a portion of said spacer pad, the bore of said clamping unit being threaded to engage the threads of said clamping screw, said limit stops comprising a slot traversing one end of said clamping unit, the inner surfaces of said last-mentioned slot being perpendicular to said clamping surfaces.

7. A magnetic head member comprising a pre-formed supporting structure, said pre-formed structure supporting at least one pair of pole pieces, said pair of pole pieces forming a magnetic circuit including a magnetic gap, said pair of pole pieces terminating in a common pole face surface the width of which is traversed by said gap, a pair of hairpin springs associated with each pair of pole pieces, one half of each hairpin spring terminating in an eccentric end substantially parallel to the main portion, the other half comprising a cantilever portion having a predetermined curvature when the spring is relaxed, the two halves of each spring gripping a wall of said supporting structure between them by virtue of the force applied by the hairpin curvature, said eccentric extension engaging a step in one side of said wall to fix the spring relative to the supporting structure, said pair of pole pieces being firmly held together in mirror image relationship by said pair of hairpin springs, said curved cantilever portion of each hairpin spring being flattened against the opposite side of said wall by said pole pieces.

8. The apparatus of claim 7 wherein said supporting structure carries two identical pairs of pole pieces, said pairs of pole pieces being spaced from each other in parallel superposed relationship whereby respective pole face surfaces lie in a common plane, and pivotal further comprising linking means carried intermediate said pairs of pole pieces by said supporting structure.

9. The apparatus of claim 8 wherein said pre-formed supporting structure comprises a die casting of non-magnetic metal, said supporting structure further containing a poured epoxy resin filler in the spaces between the divers components of said head member, said resin fixing said components in position upon curing.

10. The apparatus of claim 9 wherein said pivotal linking means comprises a conical jewel bearing adapted to mate with a pivot pin, said bearing being supported in an elongated slot of said die-cast structure for selective positioning therein, and further comprising a stabilizing rod carried by said head member and extending therefrom in a direction perpendicular to said gaps, said stabilizing rod terminating in a sphere, said sphere and a portion of said rod adapted to engage a pair of limit stops in order to circumscribe the angular motion of said head member about the axis of said pivot pin.

11. A magnetic recording head assembly for supporting at least one high density magnetic recording head, a mounting unit comprising a mounting surface and a first clamping surface, said mounting surface adapted to engage a fixed bracket, a clamping unit comprising a second clamping surface, a first bore in each of said units piercing respective clamping surfaces, a clamping screw adapted to mate with both of said bores when said clamping surfaces are aligned, a single leaf spring positioned with one end intermediate said clamping surfaces, said spring having an opening adapted to receive said clamping screw, a magnetic head member, linking means intermediate the free end of said leaf spring and said head member adapted to transmit spring pressure to the head member, said linking means being adapted to permit motion of said head member relative to said leaf spring about three mutually perpendicular axes, said leaf spring flexibly resisting pressure on its free end in a direction normal to said clamping surfaces while substantially restricting all other degrees of freedom thereof.

12. The apparatus of claim 11 wherein said magnetic head member comprises a pre-formed supporting structure, said pre-formed structure supporting at least one pair of pole pieces, said pair of pole pieces comprising a magnetic circuit including a magnetic gap, said pair of pole pieces terminating in a common pole face surface the width of which is traversed by said gap.

13. The apparatus of claim 12 and further including a pair of hairpin springs associated with each pair of pole pieces, one end of each of said hairpin springs terminating in an eccentric extension substantially parallel to the main portion, the other end having a predetermined curvature when the spring is relaxed, the two halves of each spring gripping a wall of said supporting structure between them by virtue of the force applied by the hairpin curvature, said eccentric extension engaging a step in one side of said wall to fix the spring relative to the supporting structure, said pair of pole pieces being firmly held together in mirror image relationship by said pair of hairpin springs, said other end of each hairpin spring being flattened against the opposite side of said wall by said pole pieces.

14. The apparatus of claim 13 wherein said supporting structure carries two identical pairs of pole pieces, said pairs of pole pieces being spaced from each other in parallel superposed relationship whereby respective pole face surfaces lie in a common plane, said linking means being pivotal and being supported intermediate said pairs of pole pieces by said structure.

15. The apparatus of claim 14 wherein said pre-formed supporting structure comprises a die casting of non-magnetic metal, said supporting structure further containing a poured epoxy resin filler in the space between the diverse components of said head member, said resin fixing said components in position upon curing.

16. The apparatus of claim 15 wherein said pivotal linking means comprises a pivot pin associated with the free end of said leaf spring, a conical jewel bearing supported in an elongated slot of said die cast structure for selective positioning therein, said pivot pin adapted to mate with said bearing to permit pivotal motion of said head member relative to said pivot pin about the center of said bearing.

17. The apparatus of claim 16 wherein stabilizing means are provided to restrain the angular motion of said magnetic head member about the axis of the pivot pin, said stabilizing means comprising a pair of limit stops on one of said units, a stabilizing rod carried by said head member and extending therefrom in a direction perpendicular to said gaps, said stabilizing rod terminating in a sphere having a diameter larger than that of said rod, said sphere and a portion of said rod adapted to ride between said limit stops when said conical pivot bearing engages said pivot pin.

18. The apparatus of claim 17 wherein said mounting unit contains a second bore, a slot in said clamping unit aligned with said second bore, said units capable of being rotated relative to each other about the axis of the clamping screw by the displacement of said slot relative to said second bore, and means fastening said leaf spring to said clamping unit whereby said spring may be angularly positioned relative to the mounting unit.

19. The apparatus of claim 18 wherein said leaf spring is flat, a force arm unit interposed between said leaf spring and said pivot pin, one end of said force arm unit adapted to engage the free end of the spring, the other end of said force arm unit containing an opening adapted to support said pivot pin at right angles to said clamping surfaces, whereby pressure applied to said pole face surfaces in a direction normal to said clamping surfaces is flexibly resisted by said leaf spring.

20. The apparatus of claim 19 wherein said means for fastening the leaf spring to the clamping unit comprises a shallow rectangular slot in the clamping surface of said clamping unit, a spacer pad adapted to be positioned intermediate said spring and the clamping surface of said mounting unit, said pad having an opening to receive said clamping screw, said rectangular slot accommodating said one end of the leaf spring and a portion of said spacer pad, the bore of said clamping unit being threaded to engage the threads of said clamping screw, said limit stops comprising a slot traversing one end of said clamping unit, the inner surfaces of said last-mentioned slot being perpendicular to said clamping surfaces.

References Cited in the file of this patent

UNITED STATES PATENTS

| | | |
|---|---|---|
| 2,536,272 | Friend | Jan. 2, 1951 |
| 2,647,755 | Townsley | Aug. 4, 1953 |
| 2,673,249 | Ericsson | Mar. 23, 1954 |
| 2,721,743 | Erikson et al. | Oct. 25, 1955 |
| 2,761,016 | Muller | Aug. 28, 1956 |
| 2,769,037 | Dank et al. | Oct. 30, 1956 |
| 2,772,135 | Hollabaugh et al. | Nov. 27, 1956 |
| 2,785,232 | Camras | Mar. 12, 1957 |
| 2,813,932 | Kornei | Nov. 19, 1957 |

UNITED STATES PATENT OFFICE

CERTIFICATION OF CORRECTION

Patent No. 2,961,494 November 22, 1960

William T. Darou, Jr., et al.

It is hereby certified that error appears in the above numbered patent requiring correction and that the said Letters Patent should read as corrected below.

Column 7, line 58, for "and pivotal further" read -- and further --; line 59, for "comprising linking means" read -- comprising pivotal linking means --.

Signed and sealed this 2nd day of May 1961.

(SEAL)
Attest:

ERNEST W. SWIDER
Attesting Officer

DAVID L. LADD
Commissioner of Patents